United States Patent [19]

Iijima

[11] Patent Number: 5,427,578
[45] Date of Patent: Jun. 27, 1995

[54] PULLEY FOR CONTINUOUSLY VARIABLE TRANSMISSION

[75] Inventor: Yoichi Iijima, Musashino, Japan

[73] Assignee: Fuji Jukogyo Kabushiki Kaisha, Tokyo, Japan

[21] Appl. No.: 274,264

[22] Filed: Jul. 13, 1994

[30] Foreign Application Priority Data

Jul. 27, 1993 [JP] Japan ................... 5-185069

[51] Int. Cl.⁶ ............................................. F16H 61/00
[52] U.S. Cl. ........................... 474/18; 474/28; 474/46
[58] Field of Search ................ 474/18, 28, 17, 46

[56] References Cited

U.S. PATENT DOCUMENTS

| | | | |
|---|---|---|---|
| 4,552,545 | 11/1985 | Koivunen | 474/28 X |
| 4,575,364 | 3/1986 | Lamers | 474/28 X |
| 4,639,238 | 1/1987 | Jaccod | 474/28 X |
| 4,753,627 | 6/1988 | Kawamoto | 474/18 |
| 4,884,997 | 12/1989 | Hattori | 474/18 X |
| 5,182,968 | 2/1993 | Mott | 474/18 X |
| 5,221,235 | 6/1993 | Ogawa | 474/25 |

FOREIGN PATENT DOCUMENTS 61-140334 6/1986 Japan.
62-52359 4/1987 Japan.
62-179455 11/1987 Japan.

Primary Examiner—Roger J. Schoeppel
Attorney, Agent, or Firm—Beveridge, DeGrandi Weilacher & Young

[57] ABSTRACT

In a pulley unit of belt-type continuously variable transmission, wherein a movable sheave on a pulley shaft is moved toward and away from a stationary sheave by means of a hydraulic servo device, and a movable cylinder secured to the movable sheave defines a hydraulic chamber between itself and a stationary plunger on the pulley shaft. The movable cylinder is of a ring-shape having an enlarged-diameter cylindrical portion, a reduced-diameter cylindrical portion, and a back wall portion integrally joining the two cylindrical portions radially. The reduced-diameter cylindrical portion is fitted on a hub of the movable sheave. A detachable cover member is provided around the cylinder and the plunger to define a hydraulic balance chamber. The movable sheave can be used commonly for different sizes of the movable cylinder, and the interior of the servo device can be exposed for maintenance by removing the cover member.

11 Claims, 4 Drawing Sheets

PULLEY FOR CONTINUOUSLY VARIABLE TRANSMISSION

BACKGROUND OF THE INVENTION

The present invention relates to a pulley unit of belt-type continuously variable transmission for vehicles, and specifically to a pulley unit provided with a hydraulic servo device of the construction in which a hydraulic chamber is formed between a movable cylinder secured to a movable sheave and a stationary plunger attached to a pulley shaft.

There has been heretofore generally known a belt-type continuously variable transmission used for vehicles having a construction in which a drive belt composed of a number of metal elements is wound over a primary pulley on an input side and a secondary pulley on an output side and in which each pulley has an annular groove that is variable in width.

Each of the above-described pulleys is provided with a stationary sheave integral with a pulley shaft and a movable sheave fitted on the pulley shaft so as to be shiftable toward and away from the stationary sheave. The width of the groove formed between both the sheaves is varied by shifting movement of the movable sheave. Further, a hydraulic servo device is provided to move the movable sheave toward and away from the stationary sheave.

The hydraulic servo device comprises a movable cylinder secured to the movable sheave and a stationary plunger slidably fitted in the movable cylinder and engaged with the pulley shaft, and a hydraulic chamber is formed between the movable cylinder and the stationary plunger. When the movable sheave is moved toward the stationary sheave due to oil pressure in the hydraulic chamber, the width of the pulley groove is narrowed so as to increase the winding diameter of the drive belt. It is to be noted that on the secondary pulley side, a coil spring is interposed in a compressed state between the movable sheave and the stationary plunger so that even when oil pressure in the hydraulic chamber is released, the movable sheave is pressed toward the stationary sheave by the coil spring to prevent slipping of the drive belt.

The movable cylinder is produced by deep drawing to have a stepped cylindrical configuration for covering the whole stationary plunger, and an enlarged-diameter portion thereof in which the stationary plunger is slidably fitted is secured in a liquid-tight state to an outer periphery of a flange portion projecting annularly on the back surface of the movable sheave.

The pulley unit of the type as described above is disclosed, for example, in U.S. Pat. No. 5,221,235 to H. Ogawa. In this known pulley unit, the large diameter portion of the movable cylinder is caulked to be secured to the outer periphery of the flange portion of the movable sheave. This configuration, however, has a problem in that caulking must be carried out on the enlarged-diameter portion using a special caulking machine, thus increasing the manufacturing cost.

There has been further known a type in which a movable sheave and an enlarged diameter portion of a movable cylinder fitted in an outer periphery of a flange portion thereof are fixedly joined by means such as a beam welding. In this type, however, strains caused by heat treatment is produced in the enlarged diameter portion of the movable cylinder having a thin wall thickness. It is therefore necessary to apply a grinding operation to the inner periphery of the enlarged-diameter portion in order to remove the strains, thus also increasing the manufacturing cost.

Both the known types described above have the construction in which the enlarged-diameter portion of the movable cylinder in which the stationary plunger is slidably fitted is secured to the flange portion of the movable sheave. Therefore, when the diameter of the movable cylinder is changed depending on the type of the belt-type continuously variable transmission, it is necessary to also change the outside diameter of the flange portion of the movable sheave, thus giving rise to a problem in that the movable sheave cannot be used commonly so that the kinds of the movable sheave increase.

Further, in the two known types described above, the movable cylinder having a cylindrical shape that covers the whole stationary plunger is secured to the movable sheave, thus giving rise to another problem in that the internal maintenance of the hydraulic servo device cannot be carried out.

SUMMARY OF THE INVENTION

It is an object of the present invention to provide a pulley unit of belt-type continuously variable transmission in which the manufacturing cost can be reduced as compared to that of the prior art and a movable sheave can be used commonly despite a change of the diameter of a movable cylinder, and in which the internal maintenance of a hydraulic servo device can be easily carried out.

According to the present invention, there is provided a pulley unit of belt-type continuously variable transmission, comprising: a rotatable pulley shaft; a stationary sheave fixed on the pulley shaft; a movable sheave mounted on the pulley shaft for shifting movement toward and away from the stationary sheave; the stationary and movable sheaves defining therebetween an annular groove of variable width for engaging a transmission belt; a movable cylinder provided around the pulley shaft and fixed to the movable sheave so as to be movable therewith; a stationary plunger fixed on the pulley shaft and fitted within the movable cylinder for relative sliding movement to the movable cylinder, the plunger defining within the cylinder a hydraulic chamber which constitutes hydraulic servo means for shifting the movable sheave; the movable cylinder being in a form of a ring comprising an enlarged-diameter cylindrical portion, a reduced-diameter cylindrical portion and a back wall portion integrally joining the cylindrical portions and extending radially along a side surface of the movable sheave, remote from the stationary sheave; the movable sheave having a hub fitted around the pulley shaft and having an outer surface; the reduced-diameter cylindrical portion being press-fitted on said outer surface of the hub; the plunger being slidably fitted in the enlarged-diameter cylindrical portion of the movable cylinder; and a cover member provided around the cylinder and the plunger so as to define a hydraulic balance chamber between the cover member and the plunger, the cover member being detachably fitted at one end thereof on the enlarged-diameter cylindrical portion and detachably secured at the other end thereof to the pulley shaft.

DESCRIPTION OF THE PREFERRED EMBODIMENTS

Embodiments according to the present invention will now be described in detail with reference to the accompanying drawings.

Figure 1:
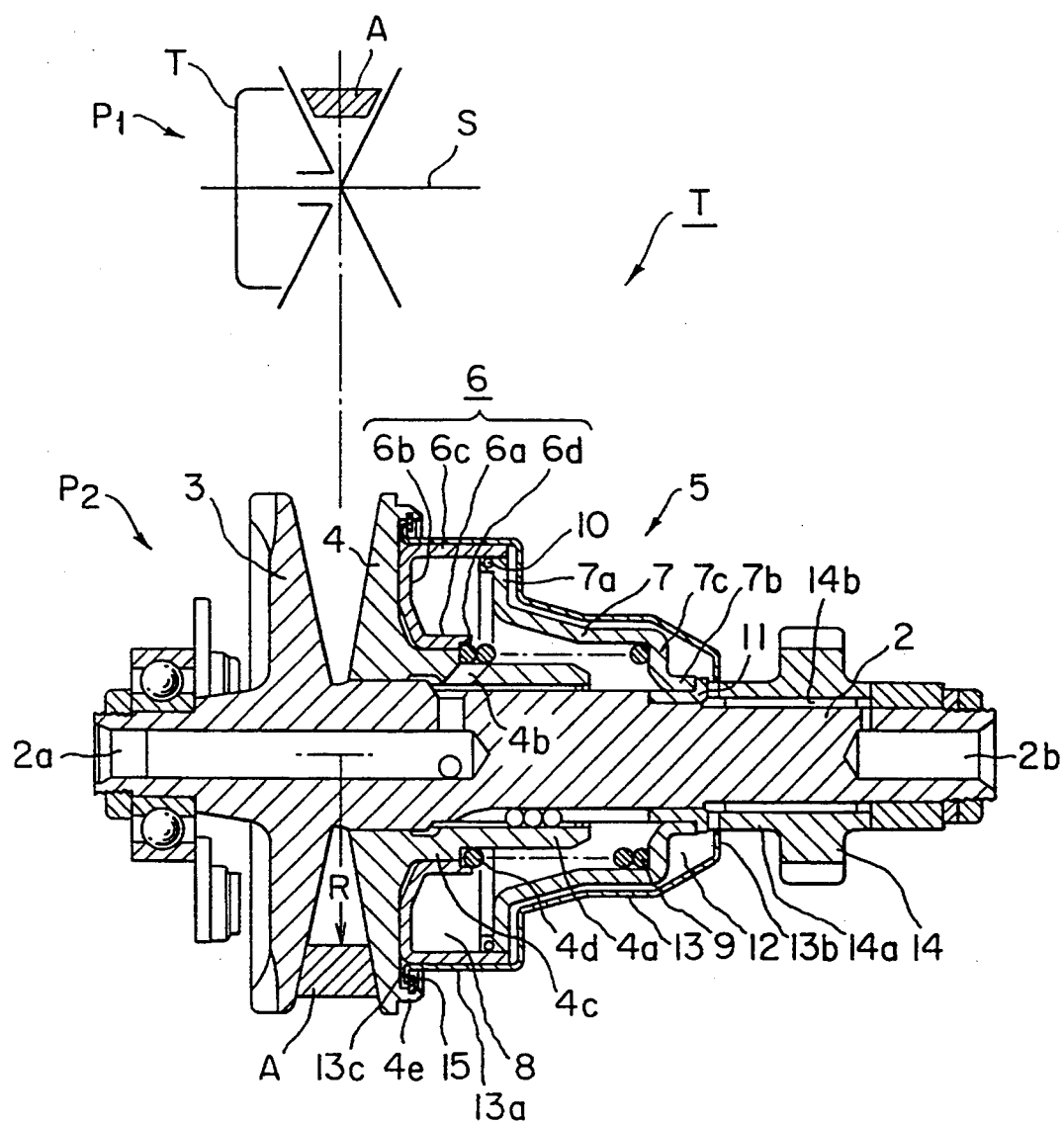
FIG. 1 is a sectional view showing a first embodiment according to the present invention.

FIG. 1 shows a first embodiment according to the present invention. Referring to FIG. 1, numeral T designates a continuously variable transmission, in which a primary pulley unit P1 is provided on a primary shaft S on an engine side so as to be capable of varying a pulley interval. A hydraulic servo device T is mounted on the primary pulley unit P1. A secondary pulley unit P2 is provided on a secondary shaft 2 on an output side, and a hydraulic servo device 5 is mounted also on the secondary pulley unit P2. A transmission belt A is wound between the primary pulley unit P1 and the secondary pulley unit P2.

The secondary pulley unit P2 is provided with a stationary sheave 3 integral with a pulley shaft 2 as a secondary shaft and a movable sheave 4 fitted on the shaft 2 slidably only in an axial direction of the shaft 2. Between the stationary sheave 3 and the movable sheave 4 is formed an annular groove in which the transmission or drive belt A is wound. The two sheaves 3 and 4 constitute a pulley. The width of the groove is changeable by axial sliding movement of the movable sheave 4.

A hydraulic servo device 5 is provided for moving the movable sheave 4 toward and away from the stationary sheave 3. The hydraulic servo device 5 has a movable cylinder 6 secured to the outer side of the movable sheave 4, and a stationary plunger 7 engaged on the pulley shaft 2, and a hydraulic chamber 8 is formed therebetween. The hydraulic chamber 8 is communicated with an oil path 2a within the pulley shaft 2 through an oil port 4b bored in a reduced-diameter portion 4a of a hub of the movable sheave 4. The movable sheave 4 has an enlarged-diameter portion 4c of the hub whose outer peripheral surface has been subjected to grinding.

Figure 2:
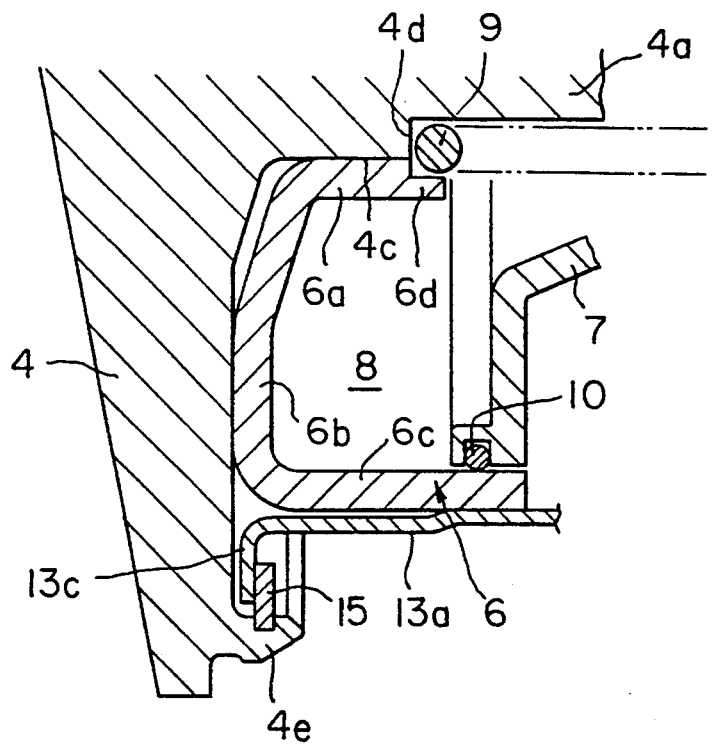
FIG. 2 is an enlarged view of a part of the embodiment shown in FIG. 1.

The movable cylinder 6 is a member produced by press forming into a ring-like configuration having a U-shaped section including a reduced-diameter cylindrical portion 6a press-fitted on the enlarged-diameter portion 4c, a back wall portion 6b extending radially along the outer side of the movable sheave 4 and an enlarged-diameter cylindrical portion 6c slidably fitted on the stationary piston 7. A radially inner surface of an extreme edge portion of the reduced-diameter portion 6a is cut out to form a spring seat 6d (FIG. 2). The seat 6d encircles the outer peripheral portion of one end of a coil spring 9 disposed externally of the reduced-diameter portion 4a of the hub of the movable sheave 4.

The stationary plunger 7 has an enlarged-diameter cylindrical portion 7a fitted through an O-ring 10 for seal in the inner peripheral wall of the enlarged-diameter portion 6c of the movable cylinder 6. The stationary plunger 7 further has a reduced-diameter portion 7b engaged on the pulley shaft 2 through a flanged ring-like stopper member 11, and a spring seat 7c. The stationary plunger 7 is formed into a stepped cylindrical configuration as a whole. The coil spring 9 is compressed between the spring seat 7c and a shoulder 4d formed between the reduced-diameter portion 4a and the enlarged-diameter portion 4c.

A cover member 13 is provided so as to form, between itself and the stationary plunger 7, a hydraulic balance chamber 12, which is separated from hydraulic chamber 8 by the stationary plunger 7. The cover member 13 has a fitting portion 13a that is detachably fitted, in liquid-tight state, over the outer peripheral surface of the enlarged-diameter portion 6c of the movable cylinder 6. The cover member 13 further has a radially inwardly extending portion 13b, which is loosely fitted on an outer peripheral surface of a boss portion 14a of a transmission gear 14 that is in spline-engagement with the pulley shaft 2. Thus, the cover member 13 is in the form of a stepped cylindrical configuration extending substantially along the outer peripheral surface of the stationary plunger 7. The cover member 13 can be fabricated by press forming. An end part 13c of the fitting portion 13a close to the movable sheave 4 is bent flangewise radially outwardly as shown in FIG. 2. The end part 13c is detachably secured to the inner periphery of an annular protrusion 4e on an outer surface of the movable sheave 4 via a suitable snap ring 15 such as a C-ring.

The hydraulic balance chamber 12 formed as above between the stationary plunger 7 and the cover member 13 is communicated with a further oil path 2b within the pulley shaft 2 through a gap between the stopper member 11 and an end surface of the boss portion 14a of the gear 14 and through gaps 14b in the spline-engagement portion of the gear 14.

The pulley unit 1 operates as follows. When the pressure in the hydraulic chamber 8 of the hydraulic servo device 5 increases, the movable cylinder 6 is urged against the movable sheave 4 so that the movable sheave 4 is moved toward the stationary sheave 3 to increase the winding diameter R of the drive belt A. On the contrary when the pressure within the hydraulic chamber 8 decreases, the movable sheave 4 is moved away from the stationary sheave 3 against the axial urging force of the coil spring 9, due to the radially inward force of the drive belt A, whereby the winding diameter R of the drive belt A decreases.

During the rotation of the pulley shaft 2, centrifugal oil pressure is generated in the hydraulic chamber 8 in accordance with the rotational speed of the shaft 2. However, the centrifugal oil pressure within the hydraulic chamber 8 is countered in respect of the axial direction by centrifugal oil pressure generated within the hydraulic balance chamber 12, so that the hydraulic servo device 5 can perform its intended function independently of the rotational speed of the pulley shaft 2. Further, during rotation of the pulley shaft 2 centrifugal force is exerted also on the coil spring 9 so as to enlarge the diameter thereof. Since the one end of the coil spring 9 supported on the shoulder 4d of the movable sheave 4 is surrounded on its outer periphery by the spring seat 6d of the movable cylinder 6, the one end of the coil spring 9 is never caused to move radially outwardly from the shoulder 4d.

On the other hand, in the pulley unit 1 according to the first embodiment, the reduced-diameter cylindrical portion 6a of the movable cylinder 6 is merely press-fitted on the finish-ground enlarged-diameter portion 4c of the hub of the movable sheave 4, during an assembling step thereof, so that the movable cylinder 6 can be secured to the movable sheave 4 easily in a simple way. Therefore, a caulking operation using a special caulking machine as in prior art is not necessary at all, and the grinding operation can be applied only to the outer periphery of the enlarged-diameter portion 4c of small diameter, whereby the manufacturing cost can be reduced as compared to the prior art.

The movable sheave 4 has the enlarged-diameter hub portion 4c on which the reduced-diameter cylindrical portion 6a of the movable cylinder 6 is simply fitted for securing, and the movable sheave 4 is not influenced by the diameter of the enlarged-diameter portion 6c of the movable cylinder 6. Therefore, even in the case where the diameter of the movable cylinder 6 (the inside diameter of the enlarged-diameter portion 6c) is changed depending on the type of the belt-type continuously variable transmission, a change in design of the movable sheave 4 is basically unnecessary, and the movable sheave 4 can be used commonly irrespective of the type of the belt-type continuously variable transmission.

Moreover, the pulley unit 1 of belt-type continuously variable transmission has the construction in which the cover member 13 that forms the hydraulic balance chamber 12 between itself and the stationary piston 7 is detachably fitted on the outer periphery of the enlarged-diameter portion 6c of the movable cylinder 6 and in which the end 13c thereof is in engagement with the inner periphery of the annular protrusion 4e of the movable sheave 4 by means of the snap ring 15. Therefore, the stationary plunger 7 will be exposed to be ready for disassembly by suitably removing the cover member 13. Accordingly, the internal maintenance of the hydraulic servo device 5 becomes possible.

It is to be noted that the configuration of the pulley unit P2 described above may be used also for the pulley unit P1.

Figure 3:
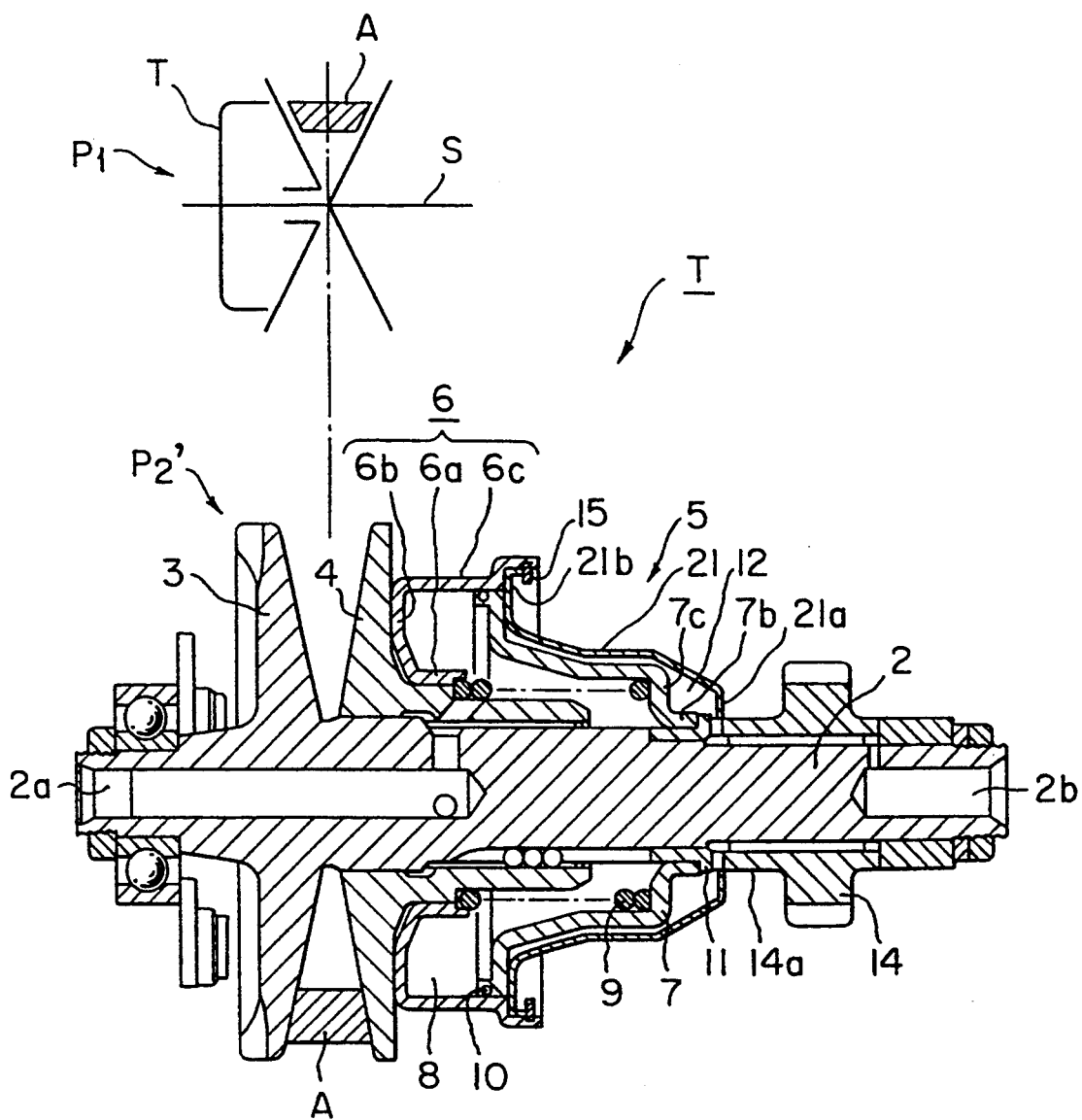
FIG. 3 is a sectional view showing a second embodiment according to the present invention.

FIG. 3 shows a pulley unit P2′ of belt-type continuously variable transmission according to a second embodiment of the present invention. In the pulley unit P2′ of belt-type continuously variable transmission, only the cover member 13 and structural parts relating thereto of the pulley unit 1 according to the first embodiment are modified, and therefore, those other than the above structural parts will be indicated by the same reference numerals as those of the first embodiment and detailed description thereof will be omitted.

Figure 4:
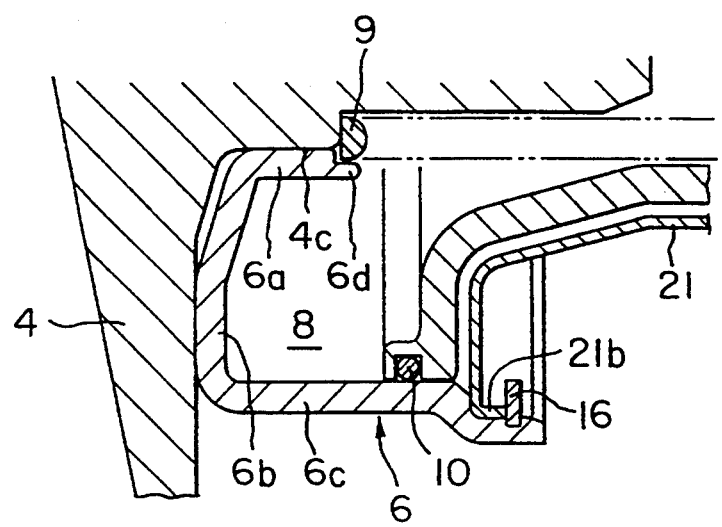
FIG. 4 is an enlarged view of a part of the embodiment shown in FIG. 3.

Here, the cover member 21 forms a hydraulic balance chamber 12 separated from the hydraulic chamber 8 by the stationary plunger 7, and the cover member 21 has a radially inwardly extending portion 21a, which is loosely fitted on the outer periphery of the boss portion 14a of the transmission gear 14 that is in spline-engagement with the pulley shaft 2. The cover member 21 is fabricated by a press into a stepped cylindrical configuration extending substantially along the outer periphery of the stationary plunger 7. A radially outer end 21b of the cover member 21 is bent to be formed into a cylindrical flange. The end 21b is detachably secured to the inner periphery of the distal end of the enlarged-diameter cylindrical portion 6c of the movable cylinder 6 through a snap ring 16 such as a C-ring, as shown in FIG. 4.

Also in the thus constructed pulley unit P2′ according to the second embodiment, the cover member 21 is detachably mounted. When the cover member 21 is removed, the stationary piston 7 will be exposed to be ready for disassembly, thus enabling internal maintenance of the hydraulic servo device 5. Since other structural parts of the second embodiment are similar to those of the previously mentioned pulley unit 1, functions and effects similar to those of the first embodiment can be obtained.

Figure 5:
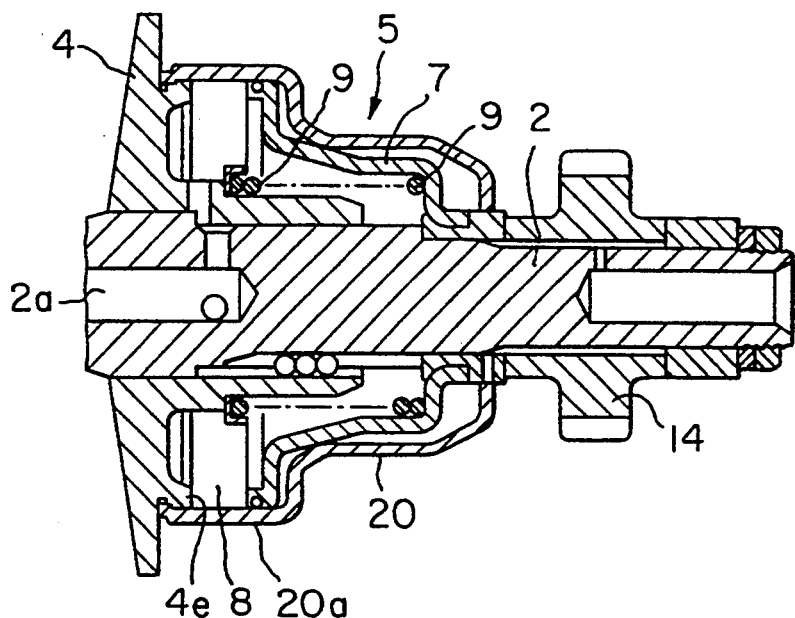
FIG. 5 is a fragmentary sectional view of a belt-type continuously variable transmission according to prior art.
Figure 6:
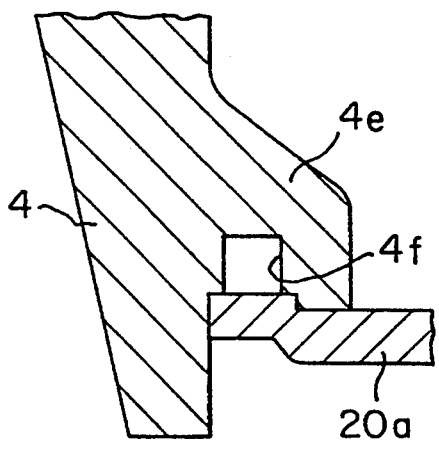
FIG. 6 is an enlarged view of a part of the transmission shown in FIG. 5.

A pulley unit described in U.S. Pat. No. 5,221,235 to H. Ogawa has such a construction as shown in FIGS. 5 and 6. A flange portion 4e of a movable sheave 4 is formed with a groove 4f for caulking, the outer peripheral surface of the flange portion 4e is produced by a precision grinding operation with a predetermined accuracy so that the former comes in close contact with the inner peripheral surface of an enlarged-diameter portion 20a of a movable cylinder 20, and the enlarged-diameter portion 20a is fitted on the outer periphery of the flange portion 4e and is caulked and secured to the caulking groove 4f (see Japanese Utility Model Laid-Open Pub. No. 62-179455), using, for example, a special caulking machine as described in Japanese Patent Laid-Open Pub. No. 61-140334. Further, in a known pulley unit shown in FIG. 7, the movable sheave 4 and the enlarged-diameter portion 20a fitted on the outer periphery of the flange portion 4e are secured to each other in liquid-tight state by means such as a beam welding (see Japanese Utility Model Laid-Open Pub. No. 62-52359).

In the construction in which the enlarged-diameter portion 20a of the movable cylinder 20 is caulked and secured to the outer periphery of the flange portion 4e of the movable sheave 4 as shown in FIG. 6, there is a problem in that it is necessary to apply a grinding operation to the outer periphery of the flange portion 4e having a large diameter and to apply a caulking operation to the enlarged-diameter portion 20a using a special caulking machine, whereby the manufacturing cost increases.

On the other hand, in the construction in which the movable sheave 4 and the enlarged-diameter portion 20a of the movable cylinder are secured to each other by means such as beam welding, strains caused by heat treatment are produced in the enlarged-diameter portion 20a having a thin wall-thickness, and in order to remove the strains, a grinding operation must be applied to the inner periphery of the enlarged-diameter portion 20a, in which case also, the manufacturing cost increases.

Figure 7:
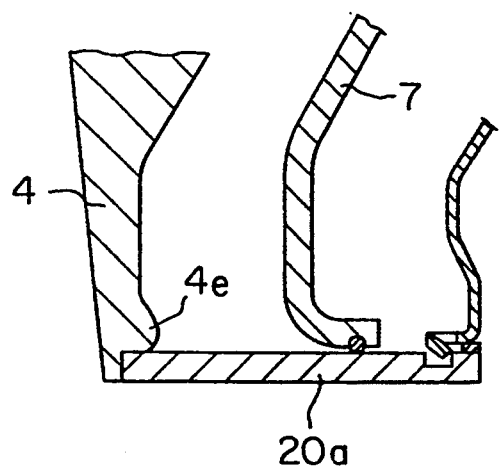
FIG. 7 is an enlarged view showing a part of another transmission according to prior art.

Further, in both the constructions shown in FIGS. 6 and 7, the enlarged-diameter portion 20a along which the stationary piston 7 slides is secured to the flange portion 4e of the movable sheave 4. Therefore, when the diameter of the movable cylinder 20 changes depending on the type of belt-type continuously variable transmission, it is necessary to change also the outer diameter of the flange portion 4e of the movable sheave 4, thus giving rise to a problem in that the movable sheave 4 cannot be used in common so that the kinds of the movable sheave must be increased.

In the constructions shown in FIGS. 6 and 7, the movable cylinder 20 in the form of a stepped cylinder to cover the whole stationary plunger 7 is secured to the movable sheave 4, thus giving rise to another problem in that the internal maintenance of the hydraulic servo device 5 cannot be done.

As compared with the prior art, the present invention employs a construction in which a reduced-diameter portion of a movable cylinder is press-fitted on the outer periphery of a hub of a movable sheave to thereby secure the movable cylinder to the movable sheave. Therefore, the present invention eliminates the necessity of caulking operation using a special caulking machine, and of the use of grinding operation to only a reduced-diameter outer periphery of the hub, thus enabling decrease of the manufacturing cost as compared with the prior art.

Further, the movable sheave has a construction in which the reduced-diameter portion of a movable cylinder is press-fitted onto a boss portion of the sheave. Therefore, also in the case where the diameter of the movable cylinder is changed depending on the type of the belt-type continuously variable transmission, a change in design of the movable sheave is not necessary, thus enabling use of the movable sheave in common.

Furthermore, there is a construction such that a cylindrical cover member for forming a hydraulic balance chamber between the cover member and a stationary plunger is detachably fitted on the outer periphery of an enlarged-diameter portion of a movable cylinder to detachably mount a distal end thereof to the movable sheave. Therefore, the cover member can be removed whenever necessary to expose a stationary plunger in readiness for disassembly. Accordingly, the internal maintenance of the hydraulic servo device becomes possible.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A pulley unit for continuously variable transmission, having a rotatable pulley shaft, a stationary sheave fixed on the pulley shaft, a movable sheave mounted on the pulley shaft for movement toward and away from the stationary sheave, and said stationary and movable sheaves defining an annular groove of variable width for engaging a belt, comprising:
   a movable cylinder provided around said pulley shaft and fixed to said movable sheave so as to be movable therewith;
   a stationary plunger fixed on said pulley shaft and fitted within said movable cylinder for relative sliding movement in the movable cylinder, said plunger defining a hydraulic chamber for shifting said movable sheave;
   an enlarged-diameter cylindrical portion provided in said movable cylinder in a form of a ring; a reduced-diameter cylindrical portion formed in said movable cylinder and connected to an end of said enlarged-diameter portion;
   a back wall portion integrally joining said cylindrical portions and extending radially along a side surface of the movable sheave, remote from the stationary sheave;
   a hub provided on said movable sheave having an upper surface and fitted around said pulley shaft;
   said reduced-diameter cylindrical portion being press-fitted on said outer surface;
   said plunger being slidably fitted in said enlarged-diameter cylindrical portion of the movable cylinder; and
   a cover member provided around said cylinder and plunger so as to define a hydraulic balance chamber between the cover member and the plunger; and
   said cover member being detachably fitted at one end thereof on said enlarged-diameter cylindrical portion and oil-tightly secured at the other end thereof to said pulley shaft.

2. The pulley unit according to claim 1, wherein:
   said cover member is fitted at said one end thereof on a radially outer surface of the enlarged-diameter cylindrical portion.

3. The pulley unit according to claim 1, wherein:
   said cover member is fitted at one end thereof on a radially inner surface of the enlarged-diameter cylindrical portion.

4. The pulley unit according to claim 1, further comprising:
   compression spring means interposed between said hub and said stationary piston.

5. The pulley unit according to claim 4, wherein:
   said hub of the movable sheave has an enlarged-diameter portion and a reduced-diameter portion, said portions of the hub defining a shoulder therebetween, one end of said spring means being abuttingly supported by the shoulder.

6. The pulley unit according to claim 4, wherein:
   said reduced-diameter cylindrical portion has a distal edge having an annular cutout forming a spring seat for encircling said one end of the spring means.

7. The pulley unit according to claim 1, wherein:
   said hub has an enlarged-diameter portion with an outer peripheral surface produced by grinding operation.

8. The pulley unit according to claim 1, wherein:
   said stationary plunge has a configuration of a stepped cylinder.

9. The pulley unit according to claim 1, wherein:
   said cover member has a configuration of a stepped cylinder.

10. The pulley unit according to claim 2, wherein:
   said one end of the cover member has a first bent end part detachably retained to the movable sheave via a first stop ring.

11. The pulley unit according to claim 3, wherein:
   said one end of the cover member has a second bent end part detachably retained to said enlarged-diameter cylindrical portion of the cylinder via a second stop ring.

* * * * *